UNITED STATES PATENT OFFICE 2,478,368

NUCLEAR SULFONATION PRODUCTS OF FATTY ACID ESTERS OF HYDROQUINONE HYDROXYALKYL ETHERS AND THEIR SALTS

John R. Caldwell, Kingsport, Tenn., assignor to Eastman Kodak Company, Rochester, N. Y., a corporation of New Jersey No Drawing. Application May 13, 1948, Serial No. 26,926

4 Claims. (Cl. 260—402)

This invention relates to aromatic sulfonic acids containing within their molecular structure ether groups, ester groups, and aliphatic hydrocarbon radicals of from nine to twenty carbon atoms, and the salts of these sulfonic acids. More particularly, it relates to compounds having the structure represented by the formula

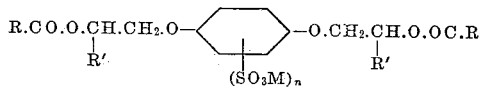

in which M represents a group selected from the class consisting of hydrogen, the alkali metals, and HAm, Am representing a non-aromatic amine, $n$ is a whole number less than 3, R represents a group selected from the class consisting of alkyl and alkylene groups containing 9 to 20 carbon atoms and cycloalkyl groups, and R' represents a group selected from the class consisting of hydrogen and methyl.

The compounds of the invention are derived from hydroquinone. The first step in preparing the compounds is to prepare a bis-β-hydroxyalkyl ether of hydroquinone. The preparation of bis-β-hydroxyethyl ether of hydroquinone from hydroquinone and ethylene chlorohydrin in the presence of caustic soda is described in U. S. Patent 2,044,083 of Knight and Sexton. Bis-β-hydroxypropyl ether of hydroquinone may be prepared as follows:

*Example I.—Intermediate product bis-β-hydroxypropyl ether of hydroquinone*

88 grams (0.8 mol) of hydroquinone, 116 g. (2.0 mols) of propylene oxide, and 1 g. of sodium hydroxide were heated in a rocking autoclave for 4 hours at 150° C. The product consisted of yellow crystals, weighing 175 g. Recrystallization from ethylene dichloride gave 165 g. (a 91% yield) of bis-β-hydroxypropyl ether of hydroquinone.

The compound is soluble in hot water, but insoluble in cold water. The melting point is 111° C.

Bis-β-hydroxyethyl ether of hydroquinone can be prepared in the same manner, from hydroquinone and ethylene oxide in the presence of potassium hydroxide.

The bis-β-hydroxyalkyl ether of hydroquinone is esterified with a non-aromatic monobasic acid, which may be a saturated or an unsaturated aliphatic acid or a cycloaliphatic acid. Suitable saturated aliphatic acids include lauric acid, palmitic acid, margaric acid, myristic acid, and stearic acid. Suitable unsaturated aliphatic acids include oleic acid and elaidic acid. Mixed aliphatic acids such as those derived from the saponification of naturally occurring fats and oils are particularly suitable. Examples of such mixed aliphatic acids are olive oil fatty acids, tallow fatty acids, whale oil fatty acids, coconut oil fatty acids, and the like. The naphthenic acids are examples of suitable cycloaliphatic acids.

The resulting ether ester is then sulfonated with a suitable sulfonating agent to give a mono- or di-sulfonic acid. Sulfonating agents that may be used include concentrated sulfuric acid, fuming sulfuric acid (10–60% $SO_3$), and chlorosulfonic acid.

If a salt is to be prepared, this sulfonic acid is then neutralized with a suitable alkali metal hydroxide, such as sodium hydroxide, potassium hydroxide, or lithium hydroxide, or with a non-aromatic amine. Examples of suitable amines are ethyl amine, n-butyl amine, cyclohexylamine, ethylene diamine, etc. A particularly useful class of amines for this purpose are the alkylolamines, such as monoethanolamine, diethanolamine, 3-hydroxy-1-butylamine, 1,3-diamino-2-hydroxypropane, 2-amino-1-butanol, etc.

An outstanding property of my aromatic sulfonic acids and salts is their miscibility with practically all types of organic liquids. They are miscible with or soluble in most types of alcohols, ketones, ethers, esters, hydrocarbons, and halogenated hydrocarbons. Furthermore, the compounds also tend to be soluble in water. They can be employed to disperse many types of organic liquids in water to give emulsions. Emulsions of the organic liquids can be formed readily by dissolving the sulfonic acid or its salt in the organic liquid, and pouring the resulting solution into water.

The compounds of the invention find their most useful application as surface active agents. The aromatic sulfonic acids and salts of my invention are valuable emulsifying agents for preparing aqueous emulsions or dispersions of mineral oils, vegetable oils, fats, waxes, etc. They are especially valuable for preparing emulsions and dispersions used in treating textile materials: for example, for lubricating yarns. The amine salts of the sulfonic acids are effective wetting-out and leveling agents for use in dyeing, textile finishing, and scouring operations. The alkali metal salts and the amine salts can be used as selective wetting agents in ore flotation processes.

The compounds of my invention are also of value as modifying agents for lubricating oils. For example, my aromatic sulfonic acids or their salts may be added in amounts of 0.1% to 1% to extreme pressure lubricants, in order to improve the film strength.

By way of illustration of the method of preparing my novel compounds, I give the following examples.

*Example II.*—One mol (198 g.) of hydroquinone bis-β-hydroxyethyl ether is esterified in a conventional manner with 2 mols (564 g.) of oleic acid to give the compound $$CH_3.(CH_2)_7.CH{:}CH.(CH_2)_7.COO.(CH_2)_2.O.C_6H_4.O.(CH_2)_2.OOC.C_{17}H_{33}$$

This ester is then dissolved in 300 cc. of ethylene dichloride and stirred at a temperature of 50–60° C. One mol (116.5 g.) of chlorosulfonic acid is slowly added with strong stirring. Hydrogen chloride gas is evolved. Air is then passed through the solution until all hydrogen chloride is removed. The resulting sulfonic acid is neutralized with monoethanolamine, and the product is isolated by evaporation of the ethylene dichloride. The salt is a viscous syrup or gum that has the structure

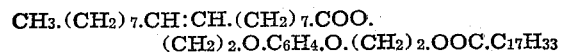

This sulfonic acid salt is a strong surface active agent and emulsifier, characterized by solubility in a wide range of solvents, including alcohols, esters, ketones, hydrocarbons, halogenated hydrocarbons, etc. It is a valuable addition agent for increasing the film strength of lubricating oils and greases. The compound is particularly useful as a conditioning and antistatic agent in the treatment of textile materials.

*Example III.*—One mol of the oleic acid diester of hydroquinone bis-β-hydroxyethyl ether, prepared as in Example II, is sulfonated with two mols of chlorosulfonic acid, by the procedure described in Example II. The product is neutralized with diethanolamine to give the salt:

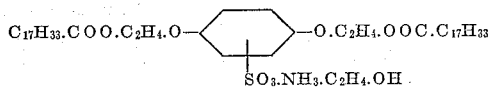

The product is a viscous oil that is readily soluble in water and most organic solvents. It is a powerful emulsifying agent and surface tension depressant.

*Example IV.*—Hydroquinone bis-β-hydroxypropyl ether is esterified with the mixed fatty acids of coconut oil to give an ether-ester having the structure represented by the formula

in which R″.CO— represents the acyl radicals of the mixture of monobasic aliphatic acids derived from coconut oil. This ether-ester is sulfonated with one mol of chlorosulfonic acid, and the resulting sulfonic acid is neutralized with butyl amine to give the salt

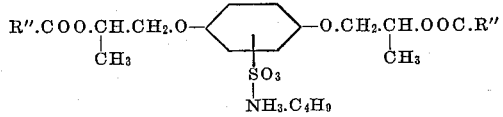

This compound is valuable as a surface active and emulsifying agent. It is soluble in a wide range of organic liquids. Aqueous dispersions can be prepared readily by dissolving the sulfonic acid amine salt in the liquid to be emulsified, and pouring the solution into water.

What I claim as my invention and desire to be secured by Letters Patent of the United States is:

1. The compounds represented by the structural formula

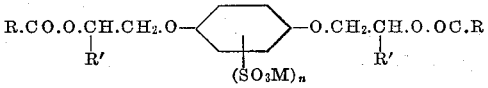

in which M represents a group selected from the class consisting of hydrogen, the alkali metals, and HAm, Am representing a non-aromatic amine, $n$ is a whole number less than 3, R represents a group selected from the class consisting of alkyl and alkylene groups containing 9 to 20 carbon atoms and cycloalkyl groups, and R′ represents a group selected from the class consisting of hydrogen and methyl.

2. The compound having the structural formula

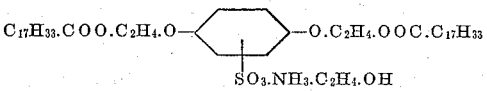

3. The compound having the structural formula

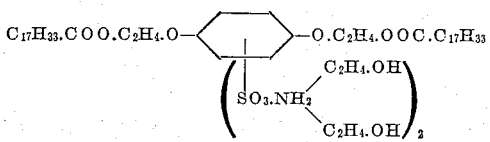

4. A compound having the structural formula

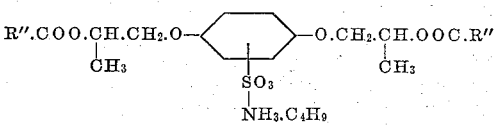

in which R″.CO— represents the acyl radicals of the mixture of monobasic aliphatic acids derived from coconut oil.

JOHN R. CALDWELL.

No references cited.